(12) United States Patent
Osato et al.

(10) Patent No.: US 7,850,904 B2
(45) Date of Patent: Dec. 14, 2010

(54) HIGH-PRESSURE TREATMENT APPARATUS AND METHOD FOR OPERATING HIGH-PRESSURE TREATMENT APPARATUS

(75) Inventors: Katsuaki Osato, Kanagawa (JP); Muneo Omura, Kanagawa (JP); Yoshinori Suto, Ibaraki (JP); Koji Tamura, Ibaraki (JP); Masao Tsurui, Kanagawa (JP); Takeshi Yamaguchi, Tokyo (JP); Jin Ogawa, Tokyo (JP); Yoshihiko Iwamoto, Hiroshima (JP); Jun Kakizaki, Hiroshima (JP)

(73) Assignee: The Japan Steel Works, Ltd., Tokyo (JP)

( * ) Notice: Subject to any disclaimer, the term of this patent is extended or adjusted under 35 U.S.C. 154(b) by 1262 days.

(21) Appl. No.: 10/554,614
(22) PCT Filed: Jun. 2, 2004
(86) PCT No.: PCT/JP2004/007998

§ 371 (c)(1),
(2), (4) Date: Feb. 2, 2006

(87) PCT Pub. No.: WO2004/105927

PCT Pub. Date: Dec. 9, 2004

(65) Prior Publication Data
US 2006/0280663 A1 Dec. 14, 2006

(30) Foreign Application Priority Data
Jun. 2, 2003 (JP) .............................. 2003-156856

(51) Int. Cl.
*A61L 2/06* (2006.01)
*A61L 9/00* (2006.01)
*B02C 1/00* (2006.01)
*B02B 1/00* (2006.01)
*A62D 3/00* (2007.01)
*B08B 9/00* (2006.01)
*B08B 3/00* (2006.01)
*F26B 5/04* (2006.01)
*F26B 19/00* (2006.01)
*F26B 21/00* (2006.01)

(52) U.S. Cl. ............................... 422/1; 422/26; 422/28; 422/32; 422/33; 422/295; 422/296; 422/297; 422/298; 422/299; 422/300; 422/307; 241/23; 241/15; 241/28; 241/38; 241/107; 241/DIG. 38; 588/312; 588/300; 134/22.15; 134/22.18; 134/30; 134/99.1; 134/102.1; 134/105; 34/411; 34/412; 34/552; 34/568

(58) Field of Classification Search ................... 422/1, 422/26, 28, 32–33, 295, 297–300, 307; 241/23, 241/15, 28, 38, 107, DIG. 38; 588/312, 300; 134/22.15, 22.18, 30, 99.1, 102.1, 105; 34/411, 34/412, 552, 568
See application file for complete search history.

(56) References Cited

U.S. PATENT DOCUMENTS
4,111,654 A * 9/1978 Fahlvik et al. ................. 422/26
(Continued)

FOREIGN PATENT DOCUMENTS
JP 59-173394 10/1984
(Continued)

*Primary Examiner*—Jill Warden
*Assistant Examiner*—Monzer R Chorbaji
(74) *Attorney, Agent, or Firm*—Jordan and Hamburg LLP

(57) ABSTRACT

An object of the present invention is to continuously feed an object to be treated to a high-pressure reactor which treats the object to be treated containing 10 mass % or more of water under high pressure, while preventing backflow of a high-pressure atmosphere from the high-pressure reactor. This is embodied by making a configuration such that the object to be treated is fed to the high-pressure reactor connected to a discharge port of a screw feeder which is provided with a feed unit for the object to be treated and the discharge port on one end side and the other end side respectively and forms a high-pressure atmosphere pressurized to, for example, 2 MPa or higher, while air-tightness between the high-pressure atmosphere and the one end side of the screw feeder is maintained by a sealing action of an accumulation compressed on the other end side of the screw feeder.

3 Claims, 5 Drawing Sheets

U.S. PATENT DOCUMENTS

| | | | |
|---|---|---|---|
| 4,284,600 A * | 8/1981 | Gillis et al. | 422/26 |
| 4,415,336 A | 11/1983 | Stasi et al. | |
| 4,772,430 A * | 9/1988 | Sauda et al. | 588/8 |
| 5,217,688 A * | 6/1993 | Von Lersner | 422/26 |
| 5,364,589 A * | 11/1994 | Buehler et al. | 422/26 |
| 5,466,108 A | 11/1995 | Piroska | |
| 6,749,816 B1 | 6/2004 | Hasegawa et al. | |
| 6,926,863 B1 * | 8/2005 | Goeldner | 422/26 |

FOREIGN PATENT DOCUMENTS

| | | |
|---|---|---|
| JP | 60-81385 | 5/1985 |
| JP | 2000-189781 | 7/2000 |
| JP | 2001-269565 | 10/2001 |

* cited by examiner (A)

(B)

(C)

HIGH-PRESSURE TREATMENT APPARATUS AND METHOD FOR OPERATING HIGH-PRESSURE TREATMENT APPARATUS

BACKGROUND OF THE INVENTION

1. Field of the Invention

The present invention relates to a high-pressure treatment apparatus for feeding an object to be treated such as, for example, wood waste (including construction waste material), paper, food waste into a high-pressure atmosphere by means of a screw feeder to treat it under high pressure and a method for operating the high-pressure treatment apparatus.

2. Description of the Related Art

Recently, waste (waste material) of wood, agricultural products, food, sludge, paper and so on, for example, is used as a raw material of biomass, and its applicability, for example, as fuel to generate power is under consideration by reforming it to improve its quality as fuel by bringing it into contact with, for example, water in a subcritical state. The reforming reaction is performed by feeding a raw material of biomass, for example, granular or block wood waste into a reaction container which is filled with, for example, high-temperature and high-pressure hot water and bringing the wood waste into contact with the hot water. It is conventionally known that a slurry pump, a screw feeder, a rotary feeder, and a vibrating feeder are used as means for feeding an object to be treated into a reaction container in such a high-pressure state (Refer to, for example, Patent Document 1.).

(Patent Document 1)

Japanese Patent Application Laid-open No. 2000-189781 (P. 14, FIG. 11)

An apparatus configuration in the case in which a screw feeder is used as the above-described feeding means to feed wood waste, for example, will be briefly described using FIG. 6. A numeral 10 in the drawing denotes a reaction container for reforming wood waste, for example, in which high-pressure and high-temperature hot water is filled. A numeral 11 denotes a screw feeder for feeding the wood waste into the reactor 10. The screw feeder 11 comprises a casing 12 constituting a main body portion and a screw mechanism 13 provided in the casing 12 for conveying the wood waste by rotation, and is configured to receive wood waste thrown into the casing 12 via a hopper 14 connected to one end side of the casing 12 and discharge it from the other end side of the casing 12, thereby feeding it into the reaction container 10.

However, in the case of using a slurry pump as the aforementioned feeding means, the pump has a problem that it cannot convey the wood waste unless the wood waste is mixed with water into a slurry state thus its mechanism fails to feed the wood waste into the reaction container 10 in a high density state with little water, and increases cost because of a large amount of heating required to change the water mixed with the wood waste into hot water. On the other hand, when the screw feeder, rotary feeder, or vibrating feeder is used, the feeder can convey the wood waste in a high density with little water, but it is difficult for these feeding means to pressure-feed the wood waste toward a high-pressure side in a large pressure difference. In the example illustrated in FIG. 6, for example, the hot water in the reaction container 10 may flow back into the screw feeder 12 unless an opening/closing mechanism 15, for example, is provided between the screw feeder 12 and the hopper 14 to equalize to some extent pressures before and after the screw feeder 12 in order to maintain the back pressure of the screw feeder 12. This leads to complicated apparatus configuration and causes another problem that it is difficult to control the opening/closing action of the opening/closing mechanism 15 so as to prevent the hot water from flowing back for continuous feed.

SUMMARY OF THE INVENTION

The present invention has been developed in view of the above situation, and an object thereof is to provide a high-pressure treatment apparatus capable of continuously feeding an object to be treated being a raw material of biomass, for example, in a state of high density into a high-pressure reactor, for example, by a screw feeder and a method for operating the high-pressure treatment apparatus.

The high-pressure treatment apparatus of the present invention is a high-pressure treatment apparatus for treating an object to be treated containing 10 mass % or more of water under high pressure, comprising:

a screw feeder provided with a feed unit for the object to be treated and a discharge port on one end side and another end side, respectively; and a treatment chamber connected to the discharge port of the screw feeder for forming a high-pressure atmosphere capable of pressure-treating the object to be treated fed from the screw feeder under a pressure of 2 MPa or higher, wherein the screw feeder maintains air-tightness between the high-pressure atmosphere and the one end side of the screw feeder by a sealing action of an accumulation compressed on the other end side during the feed of the object to be treated to the treatment chamber to thereby enable continuous feed to the treatment chamber.

The object to be treated may contain at least one of cellulose and lignin, for example. Further, the screw feeder may be configured to further comprise a first valve for opening/closing the discharge port, an air vent hole provided in the vicinity of the discharge port, and a second valve for opening/closing the air vent hole.

A screw shaft of the screw feeder may be provided with a grinding member, for example, for grinding the object to be treated. Further, two screw shafts of the screw feeder may be provided in a manner that blade members thereof mesh with each other. Furthermore, it is also adoptable to further provide a water supply unit for supplying water to the object to be treated in the screw feeder.

A method for operating a high-pressure treatment apparatus of the present invention, comprises the steps of:

feeding an object to be treated containing 10 mass % or more of water from one end side of a screw feeder with a discharge port on another end side of the screw feeder closed by a first valve to shut off the screw feeder from a treatment chamber and an air vent hole on the other end side opened;

continuously feeding the object to be treated from the one end side of the screw feeder to the treatment chamber while maintaining air-tightness between the treatment chamber and the one end side of the screw feeder by a sealing action of an accumulation of the object to be treated compressed on the other end side of the screw feeder; and treating the object to be treated fed from the screw feeder into a treatment chamber under a pressure of 2 MPa or higher.

Besides, another invention comprises the steps of:

feeding an object to be treated containing 10 mass % or more of water from one end side of a screw feeder with a discharge port on another end side of the screw feeder closed by a first valve to shut off the screw feeder from a treatment chamber and: an air vent hole on the other end side opened;

gradually closing the air vent hole by a second valve while venting air in the screw feeder from the air vent hole to build up a pressure on the other end side of the screw feeder;

opening the fist valve to cause the discharge port to communicate with an inside of a treatment chamber when a pressure of the object to be treated on the other end side of the screw feeder becomes equal to or higher than a pressure in the treatment chamber;

continuously feeding the object to be treated from the one end side of the screw feeder to the treatment chamber while maintaining air-tightness between the treatment chamber and the one end side of the screw feeder by a sealing action of an accumulation of the object to be treated compressed on the other end side of the screw feeder; and treating the object to be treated fed from the screw feeder into the treatment chamber under a pressure of 2 MPa or higher.

The meaning of "equal" in the above clause "when a pressure of the object to be treated on the other end side of the screw feeder becomes equal to or higher than a pressure in the treatment chamber" includes not only the case in which both of the pressures match, but also the case in which even though the pressure of the object to be treated on the other end side is somewhat lower than the pressure in the treatment chamber, the lower pressure is at a level within a range allowing the object to be treated to be fed from the other end side of the screw feeder into the treatment chamber.

The step of causing the discharge port to communicate with the inside of the treatment chamber may be, for example, a step of closing the second valve, and, when a pressure of the object to be treated on the other end side of the screw feeder becomes equal to or higher than a pressure in the treatment chamber, closing the second valve and opening the first valve.

DETAILED DESCRIPTION OF THE PREFERRED EMBODIMENTS

Figure 1:
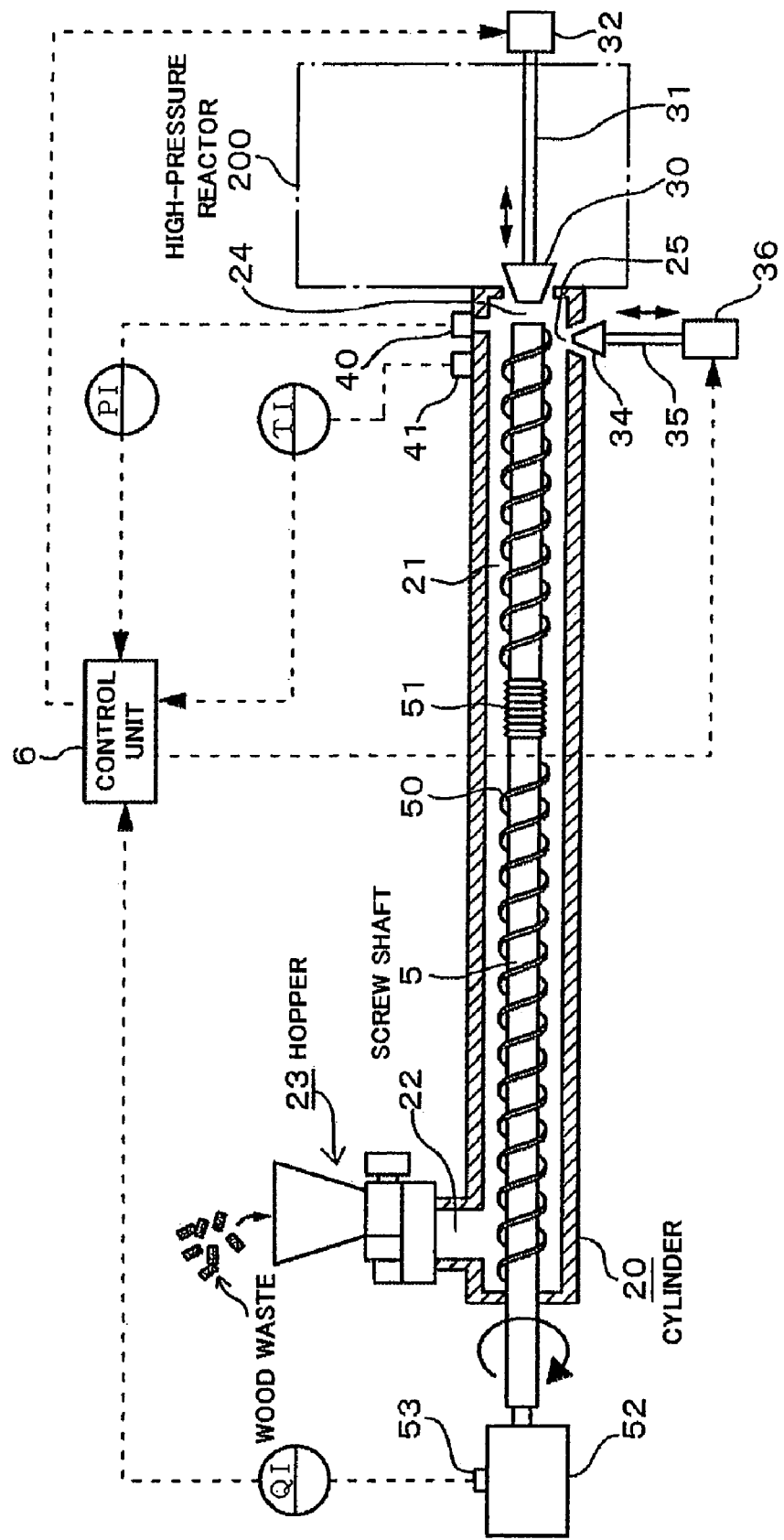
FIG. 1 is a cross-sectional view of a screw feeder according to an embodiment of the present invention.
Figure 2:
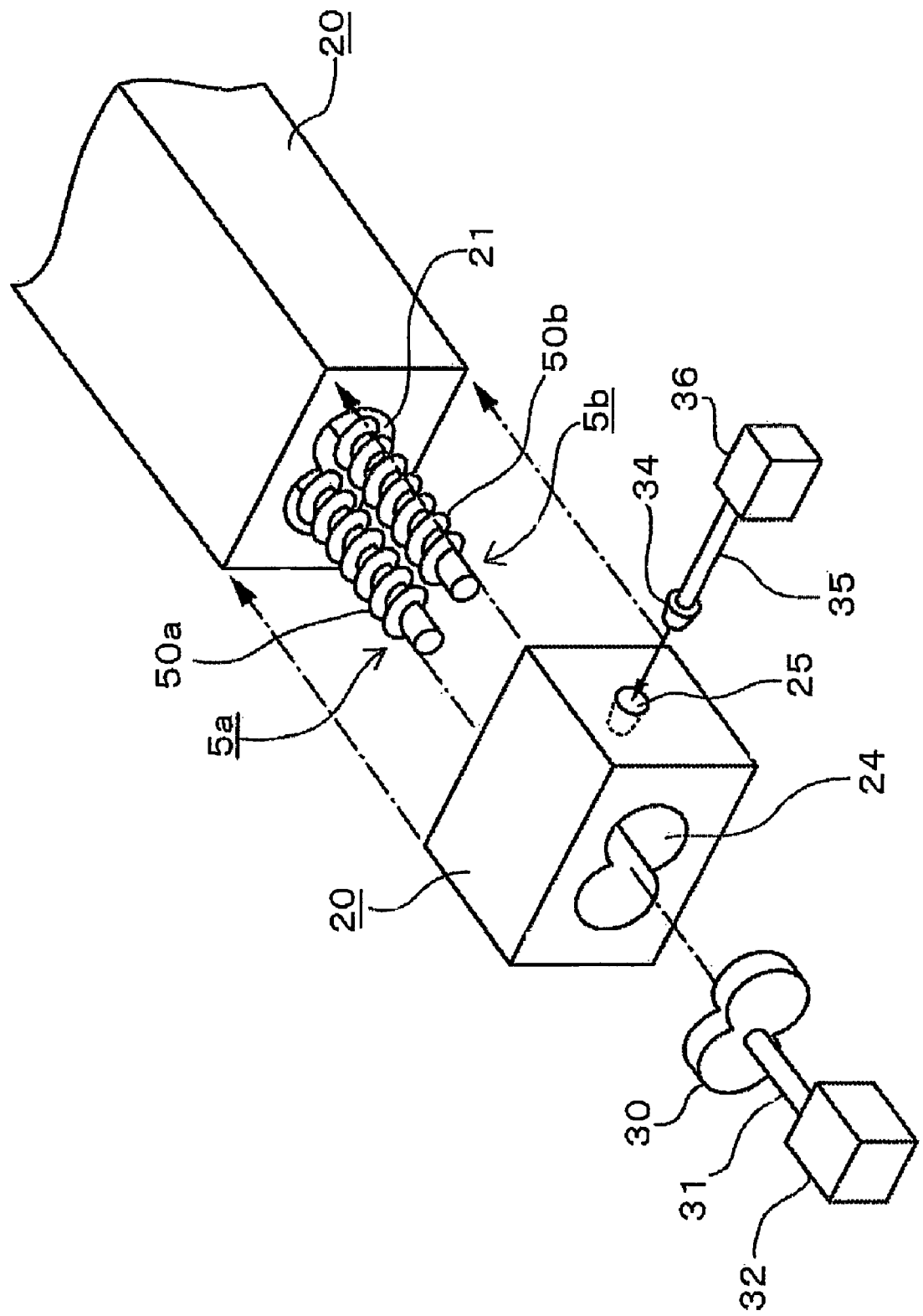
FIG. 2 is a perspective view showing a tip portion of the aforesaid screw feeder.

An embodiment of a high-pressure treatment apparatus of the present invention will be described with reference to FIG. 1 and FIG. 2. A numeral 20 in the drawings denotes a cylinder constituting a main body portion of a screw feeder, the cylinder 20 being composed of the necessary number of blocks connected in one direction. Further, inside the cylinder 20, opening portions 21 composed of two cylinders, for example, whose side peripheral surfaces communicate with each other, are formed side by side in parallel to each other from one end side to the other end side in the longitudinal direction of the cylinder 20. This opening portion 21 is constituted as a conveying path for conveying a granular or block object to be treated, for example, from the one end side to the other end side of the cylinder 20. This object to be treated is a raw material of biomass including at least one of cellulose and lignin containing 10 mass % or more, for example, preferably 10 mass % to 50 mass % of water, and is wood waste in chip form, for example, having a size of 3 mm to 100 mm, for example. Further, an upper face on the one end side of the cylinder 20 is provided with a feed port 22 that is a feed portion for the object to be treated for feeding the object to be treated into the cylinder 20, and a throwing-in means of the object to be treated such as a hopper 23 is connected to the feed port 22.

Further, a tip portion on the other end side of the cylinder 20 is provided with a discharge port 24 for discharging the object to be treated, and the discharge port 24 is configured to communicate with a treatment chamber (a high-pressure unit) for forming a high-pressure atmosphere capable of pressure-treating the object to be treated under a pressure of 2 MPa or higher, for example, such as a high-pressure reactor 200 filled with high-pressure hot water, for example, in a subcritical state for reforming wood waste. Furthermore, a first valve 30 is provided in a manner to oppose the discharge port 24, and the first valve 30 is connected to a drive mechanism 32 via a shaft portion 31, so that the discharge port 24 is closed by the first valve 30 coming into close contact therewith from the outside. Moreover, an air vent hole 25 for exhausting air in the cylinder 20 is provided in the vicinity of the discharge port 24 in a sidewall face on the other end side of the cylinder 20, and a second valve 34 is provided in a manner to oppose the air vent hole 25. The second valve 34 is connected to a drive mechanism 36 via a shaft portion 35, so that the air vent hole 25 is closed by the second valve 34 coming into close contact therewith from the outside. Further, a pressure detecting unit 40 for detecting pressure such as a pressure sensor is provided at the tip on the other end side of the cylinder 20. Furthermore, a temperature detecting unit 41 for detecting the temperature of the surface on the other end side of the cylinder 20 such as a temperature sensor is provided.

Figure 3:
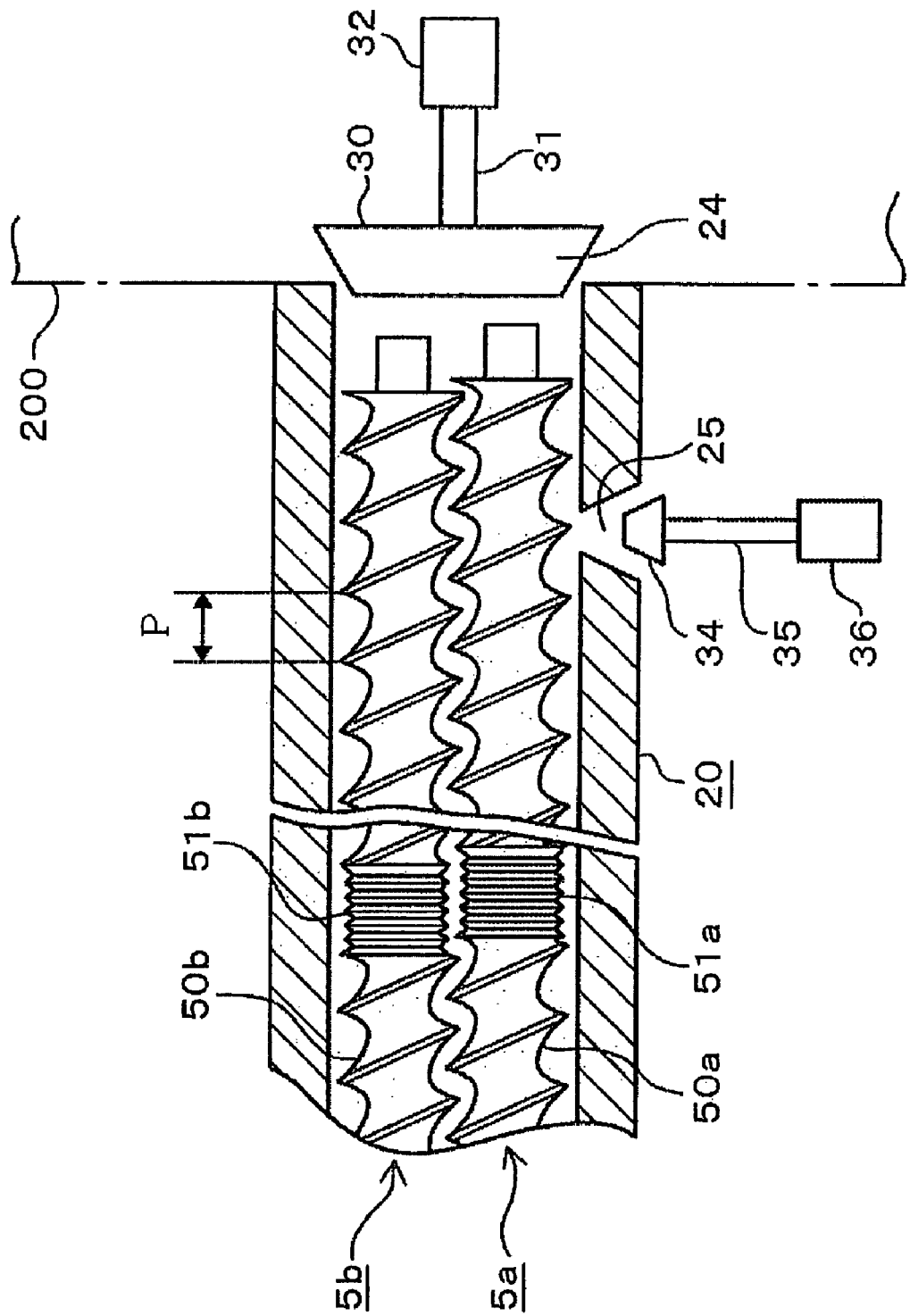
FIG. 3 is an explanatory view showing screw shafts of the aforesaid screw feeder.

Further, in the opening portions 21, two screw shafts 5a (5b) with a shaft diameter of 69 mm, for example, for conveying the object to be treated from the one end side to the other end side of the cylinder 20 are provided, supported by not-shown bearings in such a manner that the screw shafts are assigned to cylindrical opening regions of the opening portions 21, respectively. To detail the two screw shafts 5 using FIG. 3, the shaft surface of the screw shaft 5a (5b) is provided with a screw blade 50a (50b) that is a blade member spirally formed in the direction of its rotational axis and having a cross section in a generally oval or triangular shape. The two screw shafts 5 are placed side by side in a manner that the screw blade 50a and the screw blade 50b mesh with each other through a gap. It should be noted that the screw blade 50a (50b) is preferably configured such that a pitch P between adjacent blade pieces and the gap between the outer periphery of the screw blade 50a (50b) and the inner wall face of the cylinder 20 are set small to enhance the force of pushing the object to be treated directed to the high-pressure atmosphere, and the pitch P is thus set to 24 mm to 52 mm, for example, in this example.

The above-described screw shafts 5a (5b) have a function of conveying the object to be treated from the one end side to the other end side of the cylinder 20 by rotating in synchronism. Further the screw shafts 5a (5b) have a function of compressing the object to be treated containing water for densification in a region on the other end to thereby form an accumulated layer of the compressed object to be treated between the screw shafts 5a (5b) and the inner wall face of the cylinder 20, so that the sealing action of the layer is used to maintain the air-tightness between the high-pressure atmosphere in the higher pressure container 200 communicating with the discharge port 24 and the one end side of the cylinder 20. Besides, grinding blades 51a (51b) that are grinding members for finely grinding the object to be treated may be provided in the vicinity, for example, of the center of the screw shafts 5a (5b) when necessary such as when the object to be treated is in the aforementioned chip form.

Further, the one end of the screw shaft 5a (5b) is connected to a drive mechanism for turning the screw shaft 5a (5b) around its rotation axis such as a motor 52. This motor 52 is provided with a current detecting unit 53 for detecting the current flowing through the motor 52 such as an ampere meter to indirectly grasp the torque during conveyance of the object to be treated. It should be noted that while the configuration in which the two screw shafts 5 provided with the screw blades 50a (50b) such as to be spiral in the same direction are placed so that the screw shafts 5 are rotated in the same direction is described in this example, it is also adoptable to place screw shafts 5 provided with screw blades 50a (50b) which are spiral in directions symmetrical to each other so that the screw shafts 5 may be rotated in directions different from each other.

Furthermore, a numeral 6 in the drawing denotes a control unit being a control means which has a function of controlling the opening/closing action of the first valve 30 and the second valve 34 and the rotation action of the motor 52 based on any of detection results of the pressure detecting unit 40, the temperature detecting unit 41 and the current detecting unit 53. The control unit has a function of conducting interlock control, that is, closing the first valve 30, for example, to prevent backflow of the object to be treated when judging that there is a symptom of backflow of the object to be treated especially when the detection result of the current detecting unit 53 which performs sampling at predetermined intervals decreases by 20% or more, for example, from a predetermined current value, for example, the detection result of the preceding sampling.

Figure 4:
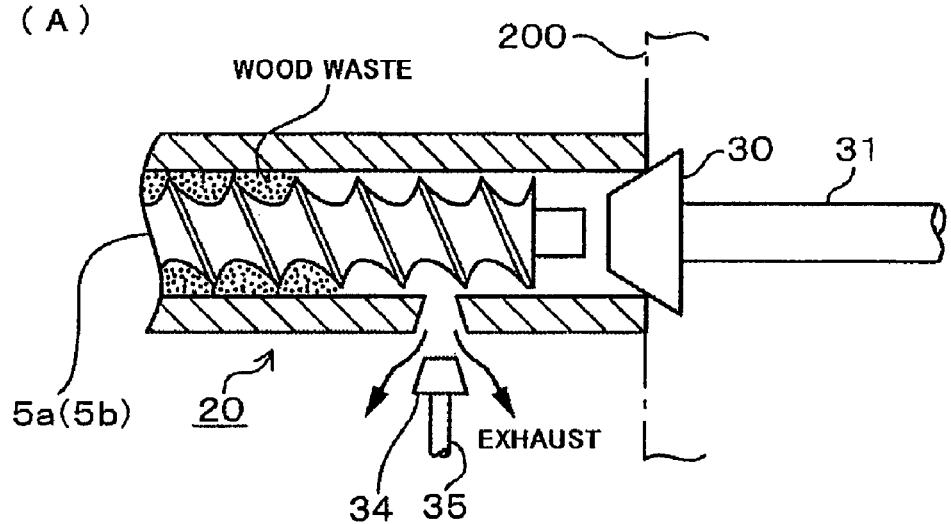
FIGS. 4A to 4C are explanatory views each showing an appearance of feeding wood waste using the aforesaid screw feeder.
Figure 4:
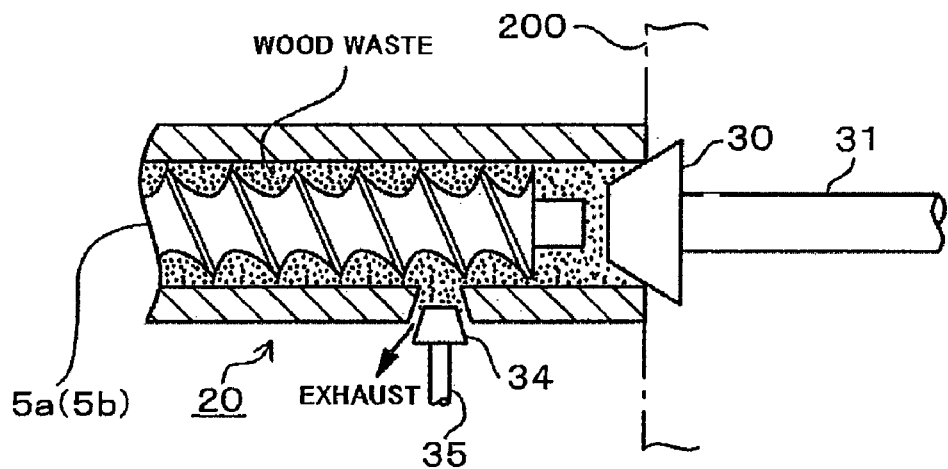
Figure 4:
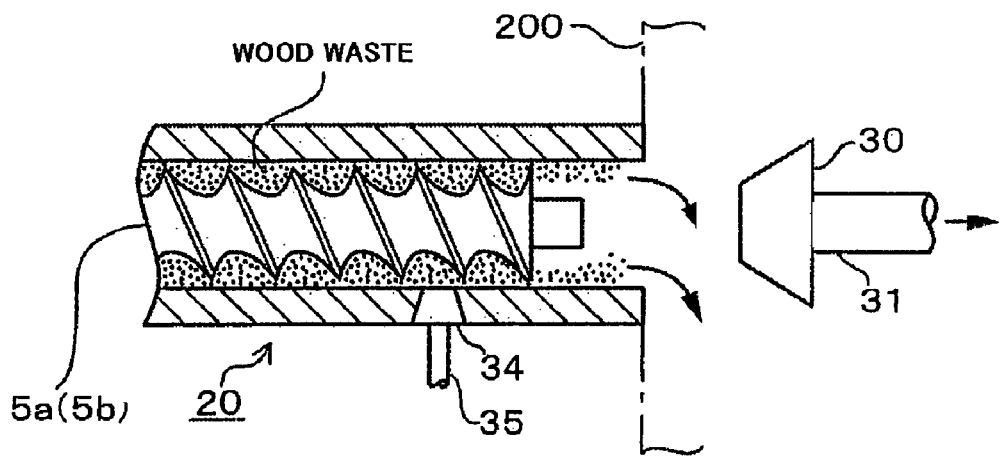

Subsequently, a method for feeding into the high-pressure reactor 200, for example, wood waste in chip form being the object to be treated containing 10 mass % or more of water will be described. First, as shown in FIG. 4A, the first valve 30 is closed and the second valve 34 is opened, as necessary, for the high-pressure reactor 200 which is filled with hot water at a temperature of 300° C., for example, and under a pressure of 2 MPa or higher, for example, preferably 7 MPa to 12 MPa, and the wood waste is thrown into the one end side of the cylinder 20 from the hopper 23 via the feed port 22 while the two screw shafts 5 are concurrently being rotated around their rotation axes by operating the motor 52. The wood waste thrown into the cylinder 20 is sequentially conveyed, loosen by the turning screw blades 50a (50b), in the opening portions 21 toward the other end side (the tip side) of the cylinder 20 by the pushing action of the screws 50a (50b). In this event, the wood waste filled in the cylinder 20 compresses the atmosphere, for example, air in the cylinder 20 to increase its temperature, thereby causing water contained in the wood waste to evaporate into water vapor, so that the air in the cylinder 20 is pushed, by the water vapor, out of the air vent hole 25 to be exhausted.

Further, the wood waste conveyed in the cylinder 20 to the other end side is finely ground by the grinding blades 51a (51b) during passing through the grinding region into a finely ground product, and conveyed to the other end side while being further loosen by the screw blades 50a (50b). Then, after the inside of the cylinder 20 is generally filled with the wood waste after a lapse of a predetermined time, for example, the second valve 34 is gradually closed as shown in FIG. 4B to finally build up the pressure at the discharge port 24. Therefore, the wood waste existing on the tip side of the cylinder 20 is compressed into a dense state, for example, to have a density after the compression of 1.2 to 1.3, and further the water previously contained therein acts as a binder to form a densified accumulation (accumulated layer) of the wood waste in which fine fibers of wood waste are intertwined with each other. Note that the result of measurement of the pressure distribution in the longitudinal direction of the cylinder 20 shows that the pressure is sharply built up at the tip portion of the cylinder 20, the present inventors estimate that this accumulated layer is formed to have a thickness on the order of 50 mm to 250 mm, for example, in the region on the tip side of the cylinder 20, for example, in the vicinity of the tip of the screw shafts 5 having a shaft diameter of 69 mm, for example.

Thereafter, when the detected result of the pressure detecting unit 40 becomes equal to or higher than the pressure in the high-pressure reactor 200, the first valve 30 is opened concurrently with the second valve 34 being closed at one stroke to feed the wood waste into the high-pressure reactor 200 as shown in FIG. 4C. The wood waste fed into the high-pressure reactor 200 is reformed by reaction in contact with the hot water, and thereafter discharged from the high-pressure reactor 200 and subjected to treatment such as dewatering/drying into biomass fuel. The reformed biomass fuel thus obtained will be used as a fuel to generate power, for example.

In the above-described embodiment, a compressed and densified accumulated layer of wood waste is formed in the region on the tip side (on the other end side) of the screw feeder, so that the accumulated layer acts as a so-called sealing layer. Accordingly, when the first valve 30 is opened for the screw feeder to communicate with the high-pressure reactor 200 at the time of start up, for example, the sealing action keeps the air-tightness between the one end side of the screw feeder and the high-pressure reactor 200, thereby preventing the hot water, which is a high-pressure fluid, from flowing back from the high-pressure reactor 200. Further, the wood waste existing on the tip side in the accumulated layer is discharged in the constant state thereafter, while wood waste sent from the one end side is sequentially added to the accumulated layer, whereby the accumulated layer can be maintained and formed. More specifically, since the high-pressure reactor 200 being a feed destination is in a high-pressure state, upon establishment of communication of the screw feeder with the high-pressure reactor 200, an action of pushing back the wood waste toward the screw feeder side and an action, against that, of pushing out the wood waste toward the high-pressure reactor 200 side of the screw shafts 5a (5b) are combined together to compress the accumulated layer of the wood waste, so that the back flow of the wood waste from the high-pressure reactor 200 can be prevented without loss of the sealing property thereof. This resultantly enables continuous feed of the wood waste in a high density to the high-pressure reactor 200 in the high-pressure state.

It should be noted that since the water contained in the wood waste acts as a binder as described above, it is desirable that the wood waste contains 10 mass % or more of water to make more reliable the sealing action of the accumulated layer. However, in terms of manufacturing cost, it is more desirable to feed the wood waste in a high density with little water contained. Further, as raw wood being the:material of the wood waste typically contains water on the order of 50 mass %, the water content of the wood waste to be thrown as the raw material is set to 10 mass % or more, for example, preferably 10 mass % to 50 mass % in this embodiment for the reason of omitting additional treatments such as drying or watering.

Further, in the above-described embodiment, the wood waste is fed from the one end side of the cylinder 20, while the air is being exhausted from the other end side of the cylinder 20 at the time of start up, and, in this event, the water vapor evaporating from the wood waste pushes out the air in the cylinder 20 to exhaust it, whereby the compressed air existing in the cylinder 20 rarely explodes so that a start up action can be easily controlled and is safe for an operator.

Further, in the above-described embodiment, the two screw shafts are provided, whereby the wood waste is conveyed, loosen by the screw blades 50a (50b) which rotate while meshing with each other. Therefore, when compressed on the tip side of the cylinder 20 thereafter, the accumulated layer with less spacing in which fine fibers of wood waste are densely intertwined with each other can be formed, resulting in a highly sealing action capable of preventing the backflow more reliably. Furthermore, the wood waste is loosened to decrease the frictional drag during the conveying, resulting in less torque applied to the motor 52, which presents an advantage that the facility cost can be reduced by selecting a small motor 52.

Further, in the above-described embodiment, the control of closing the first valve 30 based on the detection result of the current detecting unit 53 is conducted, whereby even when, for instance, such an unexpected situation that wood waste is not thrown into the hopper 23, which in turn becomes vacant occurs, backflow of the hot water on the high-pressure reactor 200 side can be prevented. More specifically, when the hopper 23 becomes vacant and the feed action to the high-pressure reactor 200 is continued without realizing the situation, the wood waste in the cylinder 20 is exhausted to cause the accumulated layer to be destroyed and the hot water to flow back in some case, but the above-described interlock control can be conducted to quickly sense the sign of the backflow and prevent it. In the case where the grinding blades 51a (51b) are provided on the screw shafts 5a (5b), the current value may vary such that the torque applied to the motor 52 is large when the grinding blades 51a (51b) are aggressively grinding the wood waste, increasing the current flowing through the motor 52, and, on the other hand, when they are not grinding wood waste, the current flowing through the motor 52 decreases. Hence, in order to prevent the interlock action from being actuated by mistake by the aforesaid variation, it is preferable to conduct control of actuating the interlock action when the detection result of the current sampled decreases by 20% or more, for example, from the predetermined current value such as the detection result of previous sampling.

Figure 5:
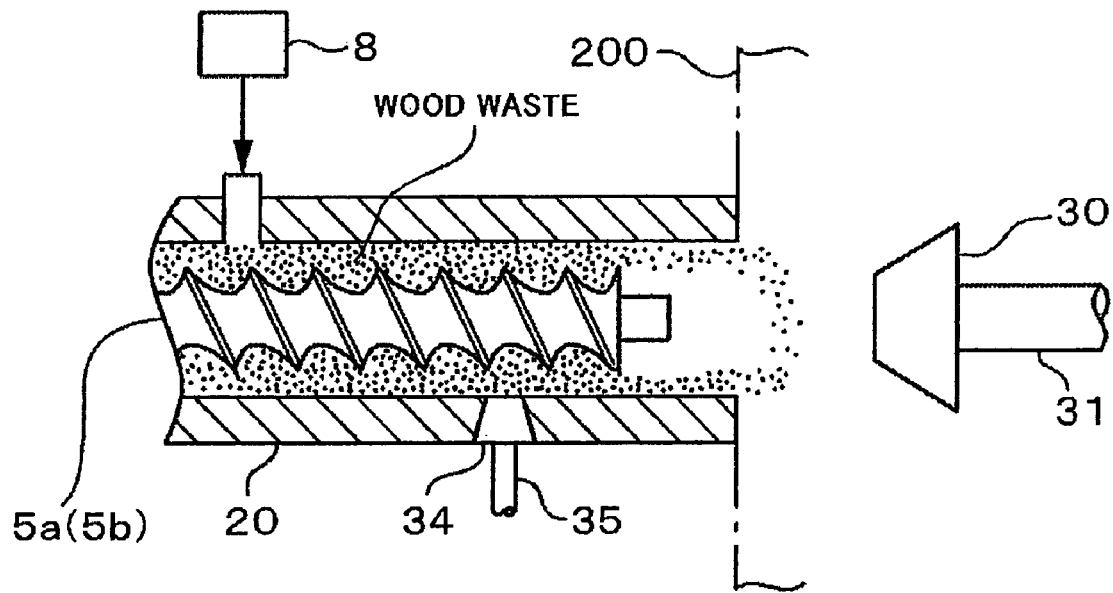
FIG. 5 is an explanatory view showing another embodiment of the aforesaid screw feeder.
Figure 6:
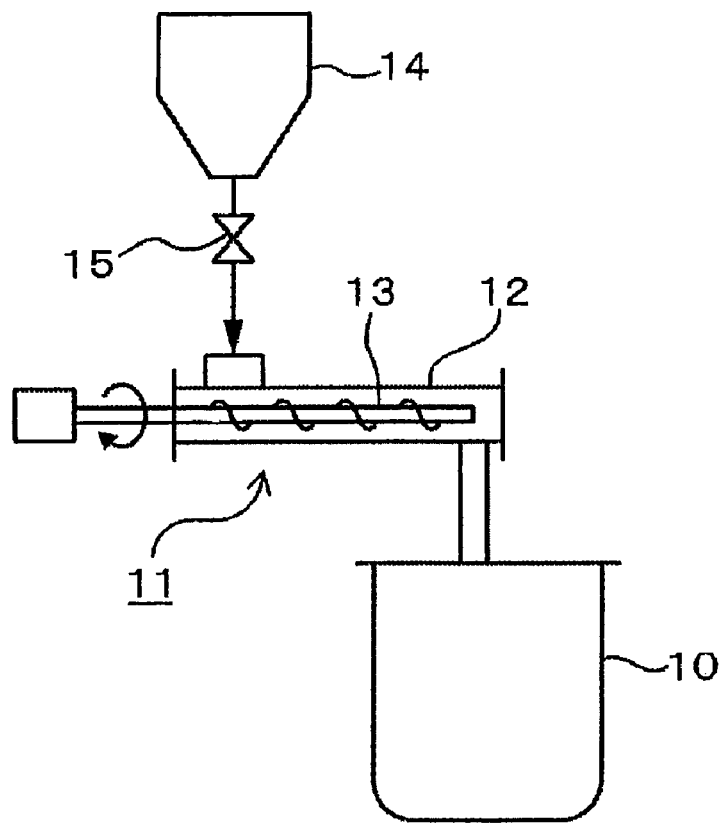
FIG. 6 is an explanatory view showing a conventional screw feeder.

In the high-pressure treatment apparatus of the present invention, it is also adoptable to provide, as shown in FIG. 5, a water supply port on the other end side, for example, of the cylinder 20 so that a water supply means 8 supplies water or water vapor, for example. In the configuration described above, the sealing action of the accumulated layer of the wood waste can be maintained more reliably by supplying a predetermined amount of water to adjust the water content of the wood waste to the aforementioned content, for example. Further, the water when supplied at the time of start up can push out the air in the cylinder 20, thereby reducing backflow and risk of explosion more reliably. It should be noted that the water supply port is not limited to the configuration in which it is provided on the other end side of the cylinder 20, but it may be provided in the central portion or on the one end side in accordance with the kind, for example, of the object to be treated, and further a plurality of water supply ports may be arranged.

Further, in the high-pressure treatment apparatus of the present invention, the number of the screw shafts 5a (5b) is not limited to two, but three shafts or more, for example, three to six shafts may be employed. Even in such a configuration, the same effect as the above-described can be obtained. Furthermore, in the high-pressure treatment apparatus of the present invention, the high-pressure atmosphere in the high-pressure unit to which the object to be treated is fed is not limited to liquid such as the hot water, but may be gas such as water vapor.

According to the present invention, as described above, the accumulation of the object to be treated which is compressed and densified is formed on the other end side of the screw feeder connected to the high-pressure unit in which a high-pressure atmosphere is formed, whereby the air-tightness between the high-pressure atmosphere in the high-pressure unit and the one end side of the screw feeder is maintained by the sealing action of the accumulation. This prevents the high-pressure atmosphere in the high-pressure unit from flowing back, so that the object to be treated in a state of high density can be continuously fed to the high-pressure unit.

What is claimed is:

1. A method for operating a high-pressure treatment apparatus to treat a material to be treated, wherein the high-pressure treatment apparatus comprises:

a screw feeder having an interior passage extending from a first end to an opposing second end, a feed port provided with a feed unit for accepting input of the material into the interior passage proximate said first end, a discharge port communicating with said interior passage provided at said second end, a pressure detecting device communicating with said interior passage at said second end, and at least one screw shaft extending axially in said interior passage between said first end and said second end;

a treatment chamber connected to said discharge port configured to receive the material from the discharge port after transport by the screw feeder and treat the material in a treatment chamber interior under a pressure of 2 MPa or higher;

a first valve that opens and closes said discharge port;

an air escape hole provided at said second end of said interior passage; and a second valve that opens and closes said air escape hole; the method of operating comprising;

feeding the material from said feed unit to the screw feeder while said second valve is open to allow air to escape through said escape hole provided at said second end and said rust valve is closed;

gradually closing said air escape hole using the second valve in order to build up pressure at said second end of the interior passage so as to compress the material while said first valve is closed;

forming an accumulation of the material at said second end of the interior passage to produce a sealing effect in said interior passage such that air-tightness is maintained between an atmosphere of the interior passage at said first end and an atmosphere of said interior passage at said discharge port said second end;

detecting pressure at said second end of said interior passage;

opening said first valve after closing said second valve, when the pressure of said interior passage at said discharge port at said second end becomes equal to or higher than the pressure in said treatment chamber interior, to communicate the treatment chamber interior with said interior passage, via said discharge port, with the treatment chamber interior under the pressure of 2 MPa or higher and to permit the material to enter said treatment chamber interior;

continuously feeding the material from the screw feeder to the treatment chamber after said opening of said first valve such that a portion of said accumulation is discharged from said discharge port into the treatment chamber, while the material that is fed from the feed unit continues to successively augment the accumulation such that the air tightness of the sealing between the atmosphere at said first end of the interior passage and the atmosphere of said interior passage at said second end is maintained by said accumulation; and treating the material fed from the screw feeder into the treatment chamber under a pressure of 2 MPa or higher.

2. The method for operating a high-pressure treatment apparatus according to claim 1, wherein the step of gradually closing the air hole by way of said second valve is subsequent to having filled the interior passage of the screw feeder with the material.

3. The method for operating a high-pressure treatment apparatus according to claim 1, wherein the treatment chamber is filled with hot water.

* * * * *